United States Patent [19]

Bivens

[11] 4,118,820
[45] Oct. 10, 1978

[54] CAR WASHING APPARATUS WITH LONG SHALLOW ANGLE SIDE BRUSH

[75] Inventor: David J. Bivens, Danville, Va.

[73] Assignee: Bivens Winchester Corporation, Danville, Va.

[21] Appl. No.: 725,884

[22] Filed: Sep. 23, 1976

Related U.S. Application Data

[63] Continuation of Ser. No. 334,807, Feb. 22, 1973, abandoned.

[51] Int. Cl.² .............................................. B60S 3/06
[52] U.S. Cl. .............................. 15/53 AB; 15/DIG. 2
[58] Field of Search ........... 15/DIG. 2, 53 A, 53 AB, 15/97

[56] References Cited

U.S. PATENT DOCUMENTS

| 1,458,179 | 6/1923 | Hamer | 15/53 AB |
| 3,090,981 | 5/1963 | Vani et al. | 15/53 AB |
| 3,500,488 | 3/1970 | Grant | 15/53 AB |
| 3,546,728 | 12/1970 | Hanna | 15/53 AB |
| 3,608,121 | 9/1971 | Smith, Jr. et al. | 15/DIG. 2 |
| 3,693,206 | 9/1972 | Tatara et al. | 15/53 AB |

FOREIGN PATENT DOCUMENTS 673,726  10/1929  France ................. 15/DIG. 2
840,505   7/1960  United Kingdom ........ 15/DIG. 2

OTHER PUBLICATIONS

Auto Laundry News; May. 1969; vol. 18, No. 5; p. 2.

*Primary Examiner*—Edward L. Roberts
*Attorney, Agent, or Firm*—Krass & Young

[57] ABSTRACT

A side brush arrangement for a car wash including parallel-mounted primary and secondary brushes rotating in opposite directions. The brushes are inclined at an attitude of about 20° from the horizontal away from the direction from which the vehicle approaches to prevent damage to external appendages such as radio antennas. The manner of support of the primary brushes is such that they can pivot in and out while remaining parallel to the vehicle sides to accommodate different vehicle contours and widths while being inclined at a shallow angle. The primary brush is between twelve and fifteen feet in length so as to engage at least 50% of the overall length of a vehicle being washed and to perform a thorough scrubbing on the vehicle. A segmented brush with varying bristle stiffness is disclosed. The secondary brush shaft is connected via a universal joint to the shaft of a horizontal wheel brush so that a single motor may drive both brush shafts.

13 Claims, 1 Drawing Figure

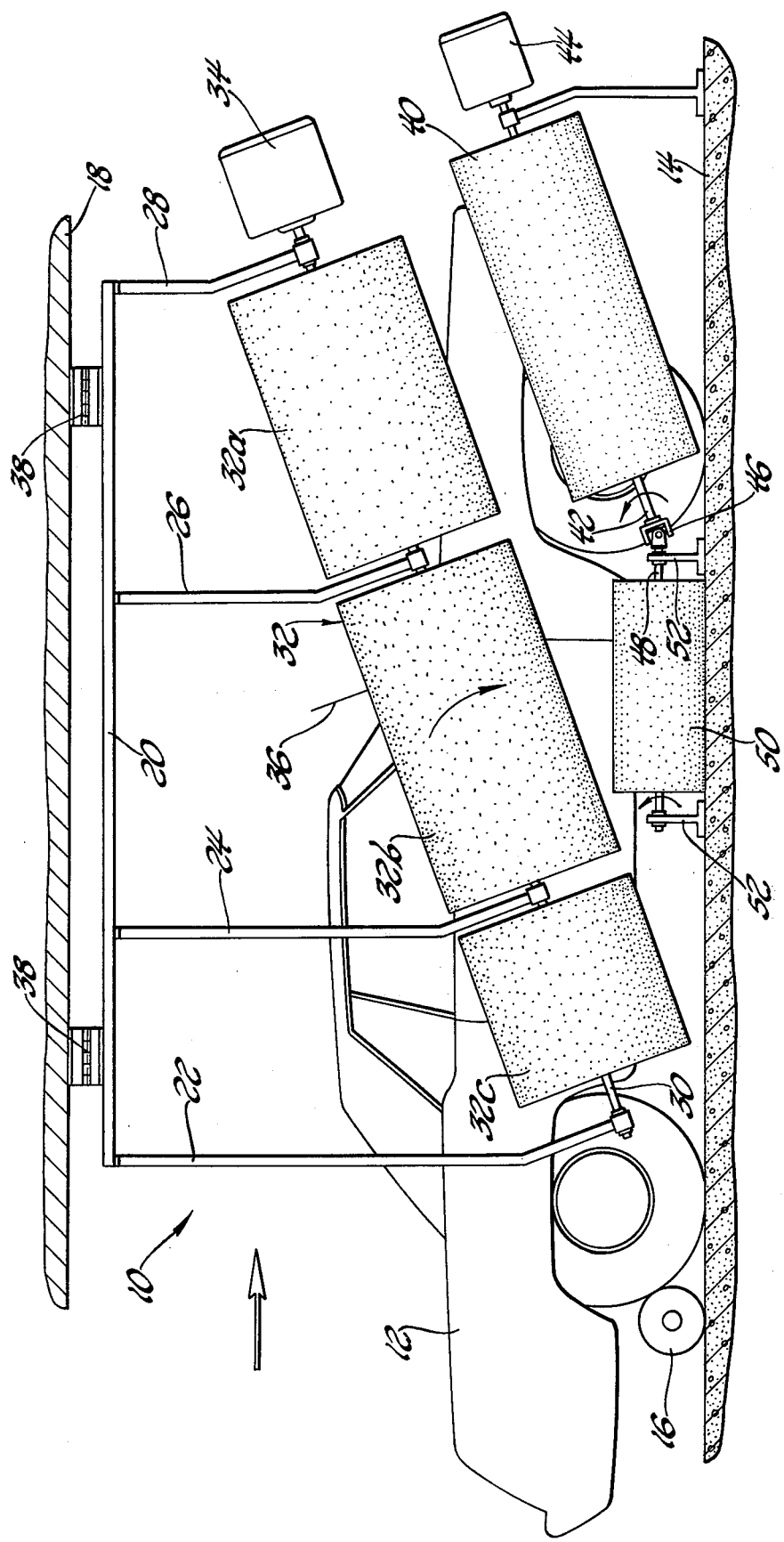

CAR WASHING APPARATUS WITH LONG SHALLOW ANGLE SIDE BRUSH

REFERENCE TO RELATED APPLICATIONS

This application is a continuation of U.S. Ser. No. 334,807, filed Feb. 22, 1973, now abandoned, entitled "Car Washing Apparatus With Long Shallow Angle Side Brush" and assigned to the assignee of the subject application.

INTRODUCTION

This invention relates to vehicle washing apparatus and particularly to a side brush arrangement including a substantially cylindrical and rotatable scrubbing brush disposed laterally adjacent a wash lane and of such length and disposed in such a shallow angle attitude as to instantaneously contact the vehicle along a very substantial portion of the length thereof.

BACKGROUND OF THE INVENTION

It is common to employ a plurality of cylindrical side brushes having substantially vertical axes of rotation in an automatic car washing apparatus. Such brushes are typically mounted for pivotal displacement toward and away from a vehicle wash lane so as to contact at least the side surfaces of the vehicle as it progresses past the brushes.

One of the problems associated with the use of such vertically oriented brushes is the fact that the direction of tangential motion of the rotating brush bristles relative to the side of the vehicle is substantially horizontal. Accordingly, the brush bristles can damage or dislocate vehicular appendages, such as radio antennas and side mounted rear view mirrors. In addition, such vertically oriented side brushes are in scrubbing contact with any given area of the vehicle side surface for only a brief instant and, accordingly, the thoroughness of such scrubbing is occasionally less than adequate, particularly after the brush bristles have become partially worn or if the vehicle surface is characterized by one or more vertical surface discontinuities or contouring.

Also, while it has been recognized that to maximize the scrubbing effectiveness of the brushes it is desirable to rotate the same against the movement of the vehicle in the wash line, if the brushes were inclined towards the vehicle as is the standard practice, the tangential movement would be downward with respect to the vehicle antenna, producing a buckling deflection of the antenna tending to cause breakage thereof, even if the brushes were inclined at a long shallow angle so as to minimize side forces on the antenna as is taught by the present invention.

BRIEF SUMMARY OF THE INVENTION

The subject invention has for its principal objectives the provision of a side brush arrangement for vehicle washing apparatus wherein the tangential scrubbing action of the brush on the vehicle is in such a direction as to be substantially harmless and nondamaging in its effect on vehicular appendages, such as radio antennas and rear view mirrors. In addition, a principal objective of the present invention is the provision of a side brush which performs an extremely thorough scrubbing action on the entire side surface of a vehicle to be washed. In general, these objectives are accomplished by the provision of a rotatable elongated brush positioned adjacent a vehicle wash lane for scrubbing the entire side surface of the vehicle, including lower portions, such as rocker panels, and upper portions, such as windows and roof line, wherein said cylindrical brush is disposed in an attitude of between about 10° and 45° from the horizontal and further wherein said brush is of such length as to instantaneously contact the vehicle over at least about 50 percent of the overall length of the vehicle.

In order to accommodate movement of the cylindrical brush laterally in and out parallel to the vehicle side while allowing the long shallow brush attitude, a support frame is provided adapted to be pivoted about a horizontal axis parallel to the vehicle wash lane, with the angled support for the cylindrical brush being provided by angled arms integral with the support frame.

The brush is inclined away from the direction from which the vehicle approaches such that the engagement with the vehicle antenna is upward tending to align the antenna with the direction of the brush movement without inducing buckling deflection so as to cause fracture thereof.

In the preferred embodiment hereinafter disclosed in greater detail, the side brush is pivotally mounted on a support for lateral displacement toward and away from the vehicle wash lane thereby to accommodate vehicles of varying width. In addition, the side brush is disposed in an attitude of approximately 20° from the horizontal and is approximately 12 to 15 feet in length so as to simultaneously engage a very substantial portion of the vehicle and to remain in engagement with the vehicle for an extended period of time during relative displacement between the vehicle and the brush. These figures are, of course, given by way of illustration and such brush lengths and attitude may, of course, vary in accordance with the particular application to which the invention is placed.

Another feature of the invention is the provision of a segmented brush and segmented support system to accommodate the extraordinary length of the brush and to permit variation in the bristle stiffness of the brush along its length. In general, this is accomplished by means of a brush having a common elongated support shaft and a pivotal support frame having a plurality of depending arms which contact the brush shaft at various spaced locations along its length. In addition, the lower bristles of the brush are typically made more stiff than the upper bristles of the brush thereby to impart a more vigorous scrubbing action to the lower extremities and wheels of the vehicle where road dirt and grime typically accumulates in greater quantities.

Another feature of the invention is the use of multiple parallel brushes rotating in opposite directions. A still further feature of the invention is the use of a jointed brush rotation shaft assembly comprising a universal joint so as to permit the axis of one brush to be angularly disposed relative to the axis of rotation of another brush whereby a single motor may be employed to rotate both brushes about their axes of rotation.

The various features and advantages of the invention will become more apparent upon reading of the following specification which describes a specific and illustrative embodiment of the invention in detail.

BRIEF DESCRIPTION OF THE DRAWING

The single FIGURE illustrates in side view a vehicle washing apparatus including a wash lane with a vehicle progressing therethrough in the direction of the arrow, a single long side brush pivotally supported for engagement of a substantial portion of the vehicle along its length and a multiple side and wheel brush arrangement having a universal joint connection between the shafts thereof.

DETAILED DESCRIPTION OF THE SPECIFIC EMBODIMENT

In the drawing there is shown a representative portion of an apparatus 10 for scrubbing the side surfaces including wheels and windows of an automotive vehicle 12 which is disposed in a wash lane defined by a track in floor 14 and being propelled through the wash lane by a motor driven push roller 16. The vehicle 12, when propelled by push roller 16 in the direction of the arrow, progresses slowly past a fixed support frame 18 having secured thereto a rigid frame 20 having a plurality of spaced depending angled arms 22, 24, 26 and 28. The angled arms of frame 20 line in a plane which laterally adjacent and substantially parallel to the side surfaces of the vehicle 12 in the wash lane. Angled arms 22, 24, 26, and 28 are secured to a shaft 30 at spaced points therealong to provide support for a cylindrical elongated car washing brush 32 with the angling of the angled arms 22, 24, 26, and 28 producing an inclination of the cylindrical car washing brush 32 as shown. Brush 32 is of the type comprising a plurality of radially oriented bristles of suitable material so as to assume as substantially cyldinrical shape when rotated by the motor 34 carried on the arm 28 of frame 20. The frame 20 configuration permits the brush 32 to be pivoted while remaining parallel with the vehicle so as to move into instantaneous engagement with the side surfaces of vehicle 12 to scrub the vehicle so as to remove surface film, dirt, etc. It is to be understood that means for providing a stream or spray of water, either with or without a detergent or soap content, are provided to operate in conjunction with the scrubbing action of the brush 32.

As shown in the FIGURE, the brush 32 is positioned in the frame 20 by virtue of the angled arms 22, 24, 26, and 28 in an attitude of approximately 20° from horizontal and is of a length which may vary between approximately 12 and 15 feet in length in the typical case so as to instantaneously engage the side surface of vehicle 12 along from 50 to 75 percent of the length of vehicle 12. In addition, the length of the brush 32 is such as to cause the vertical projection of the brush to extend over the full height of the vehicle from wheels and rocker panels to just over the roof line such that a full longitudinal traversal of the vehicle 10 through the wash lane causes the brush 32 to engage and scrub the side surfaces of vehicle 12 in an extremely complete and thorough manner. In the shallow 20° attitude of brush 32, it will be observed from the drawing that the direction of tangential motion of the bristles as they contact the side surfaces of vehicle 12 is substantially parallel and upward relative to the orientation of the vehicle antenna 36 thereby to impose little, if any, bending or buckling forces on the antenna as might be imposed be a vertically oriented, and rapidly rotating brush or by one rotating into the vehicle antenna. Of course, not all vehicle antennas are disposed at the same angle and, accordingly, the illustration in the drawing does not represent all cases. However, it is to be understood that the shallow angle attitude of brush 32 as well as the overall length thereof is such as to produce very small horizontally oriented loadings on the exterior appendages of all vehicles regardless of orientation. In addition, it will be observed that the brush 32, because of its shallow angle attitude, remains in contact with all surfaces of the vehicle for a substantially longer period of time than would be true for a vertically oriented brush and a vehicle 12 progressing at the same longitudinal rate.

Frame 20 is suspended from the support frame 18 by means supporting the frame 20 comprised of hinges 38 aligned along an horizontal axis parallel to the wash lane so as to permit the entire frame and the brush 32 to pivot laterally toward or away from the wash lane thereby to accommodate vehicles of varying widths while maintaining the brush 32 parallel to the vehicle sides at all positions in the pivotal movement. In addition, means such as weights and pulleys or, alternatively, an air cylinder or the like may be employed for automatically or semiautomatically regulating the pivotal orientation of frame 20 relative to the vehicle in the wash lane. These features are well known to those skilled in the car washing apparatus art and accordingly, will not be described in great detail in this specification.

The brush 32 is effectively divided into three segments 32A, 32B, and 32C of which segment 32A engages the windows and upper surfaces of vehicle 12 and segment 32C engages the rocker panels and lower surfaces of vehicle 12. All of the bristles in the three segments may, of course, be made of the same material and of the same stiffness and consistency, thus, to present a uniform scrubbing force on all portions of the vehicle. Alternatively, the bristles of the lower segments 32C are made of a stiffer or more abrasive material, thus, to impose a more vigorous scrubbing action on the lower surfaces and wheels of the vehicle 12 where road dirt accumulates in the heaviest concentrations. This nonuniform bristle consistency may, of course, be found in a nonsegmented as well as a segmented brush, it being understood that the intermediate arms 24 and 26 of frame 20 are employed because of the extraordinary length of brush 32 and the need for intermediate support to relieve the bearings at the connections of the end arms 22 and 28 to the shaft 30.

In the illustrative embodiment, a second brush 40 of a length of approximately 3 or 4 feet is disposed in parallel relationship beneath and in substantially the same plane as brush 32. Brush 40 is also of cylindrical configuration and is supported by means of a shaft 42 which is rotated by motor 44 in a direction opposite to the direction of rotation of brush 32. Brush 40 scrubs only the lower surfaces of the vehicle 12.

Shaft 42 of brush 40 terminates at the lower left-hand end in a universal joint 46 which forms a mechanical connection to the shaft 48 of horizontal tire sidewall brush 50. The shaft 48 is supported at the opposite ends by means of bearing blocks 52 which are disposed on the floor 14 of the wash lane. Brush 50 is preferably made of extremely stiff bristle material so as to scrub the sidewalls of the tires of vehicle 12 as the vehicle progresses along the wash lane. Because of the universal joint connection between the shafts 42 and 48, a single motor 44 is operative to drive both brushes 40 and 50.

It will be understood that the specific embodiment of the invention described above and shown in the FIGURE is subject to numerous modifications within the framework of the present invention. For example, it is possible that the vehicle 12 may be propelled along the wash lane by means of a tow bar or by means of its own power rather than by the push roller 16; such alternative car washing instrumentalities being well known to those skilled in the art. In addition, it is possible to dispense with the second brush 40 and to effect a universal joint connection directly between the shaft 30 of brush 32 and the shaft 48 of sidewall brush 50. These modifications are not exhaustive of the various possibilities and it is assumed that numerous other modifications will occur to those of ordinary skill in the art.

The embodiments of the invention in which an exclusive property or privilege is claimed are defined as follows:

1. Vehicle washing apparatus including means defining a wash lane for a vehicle to be washed; brush support means adjacent said wash lane; a substantially cylindrical side brush carried by said support means for washing a side surface of a vehicle in said lane; said brush being disposed in an attitude of between about 10° and 45° from horizontal and of such length as to instantaneously contact the vehicle over at least about 50% of its overall length; and, means for rotating the brush about the longitudinal axis thereof to effect a scrubbing action on said side surface, said side brush comprising a plurality of axially spaced segments, said support means including a frame having depending arms secured to said brush between said segments, the lower segments of said brush comprising bristles of a material which is stiffer and more abrasive than the bristles of the upper segments of said side brush.

2. Vehicle washing apparatus as defined in claim 1 wherein said brush support means comprises a relatively fixed support frame and a pivotal support frame, said pivotal support frame being secured directly to said brush and pivotal to permit said brush to be displaced laterally relative to the wash lane thereby to accommodate vehicles of various widths.

3. Vehicle washing apparatus as defined in claim 1 wherein the length of said side brush is at least about twelve feet.

4. Vehicle washing apparatus as defined in claim 1 including at least one addition side brush disposed parallel to and in substantially the same vertical plane as said first mentioned side brush and means for rotating said second brush in a direction opposite to that of said first mentioned side brush.

5. Vehicle washing apparatus as defined in claim 4 including a tire sidewall brush disposed adjacent said wash lane and at a height so as to normally engage the tires of a vehicle progressing through said wash lane, said sidewall brush having a central drive shaft, said second brush also having a central drive shaft and a universal joint connection between said drive shafts.

6. Vehicle washing apparatus as defined in claim 1 including means for effecting relative movement between the vehicle and said side brush.

7. In a vehicle washing apparatus, a first side brush disposed laterally adjacent a wash lane for engaging the side surfaces of a vehicle progressing through said wash lane and relative to said brush, said brush having a centrally located first support shaft, means for rotating said first support shaft, said first support shaft being disposed at an angle of between 10° and 45° from the horizontal, a second side brush disposed adjacent said wash lane and having a centrally located second support shaft, said second support shaft being inclined at an angle to said first support shaft and mechanical joint means connecting the first and second support shafts for common rotation thereof.

8. Washing apparatus for vehicles having an upstanding mast-type antenna and including means defining a wash lane for said vehicle to be washed; a substantially cylindrical brush having relatively long flexible bristles for engaging the side of said vehicle; means for supporting said brush with a longitudinal axis thereof in a substantially forwardly inclined attitude at a shallow angle to the horizontal, less than 45° and of a length and positioned such that said brush instantaneously contacts substantially the entire side of said vehicle both above and below the window line and such that when the brush is axially rotated against the forward movement of said vehicle the tangential motion of said brush, when in contact with said vehicle, is in a direction substantially parallel to and predominantly upwardly with respect to the longitudinal axis of said vehicle antenna by said shallow angle inclination thereby to minimize lateral forces imposed on the antenna by the bristles of the rotating brush while the car is in the wash lane; and drive means carried by said support means for rotating said brush about the cylindrical axis thereof for engaging said vehicle.

9. Vehicle washing apparatus as defined in claim 8 wherein said support means includes means for providing pivotal displacement of the brush laterally of the vehicle wash lane to accommodate vehicles of various width.

10. Vehicle washing apparatus as defined in claim 8 wherein the angle of the axis of the brush from horizontal is approximately 20°.

11. Vehicle washing apparatus including means defining a wash lane for a vehicle to be washed; at least one elongated brush at least of a length to contact instantaneously vehicles to be washed for 50% of their length; brush support means positioning said brush adjacent said wash lane to be in position to contact a side surface of a vehicle moving through said wash lane including a frame supported for pivotal movement about a horizontal axis parallel to said wash lane; means supporting said brush on said frame at an angle of 10° to 45° when said frame is pivoted to a substantially vertical position; and means for rotating said brush about the longitudinal axis thereof to effect a scrubbing action on said side surface.

12. The apparatus according to claim 11 wherein said means supporting said brush on said frame includes a plurality of angled arms on which said brush is rotatably supported.

13. The apparatus according to claim 11 wherein said brush is supported on said frame to be angled away from the direction said vehicles approach said brush in said wash lane, and wherein said brush is rotated by said means rotating said brush in a direction opposite said direction from which said vehicle approaches, whereby the tangential movement of said brush is in a generally upward direction.

* * * * *